2,744,988
Patented May 8, 1956

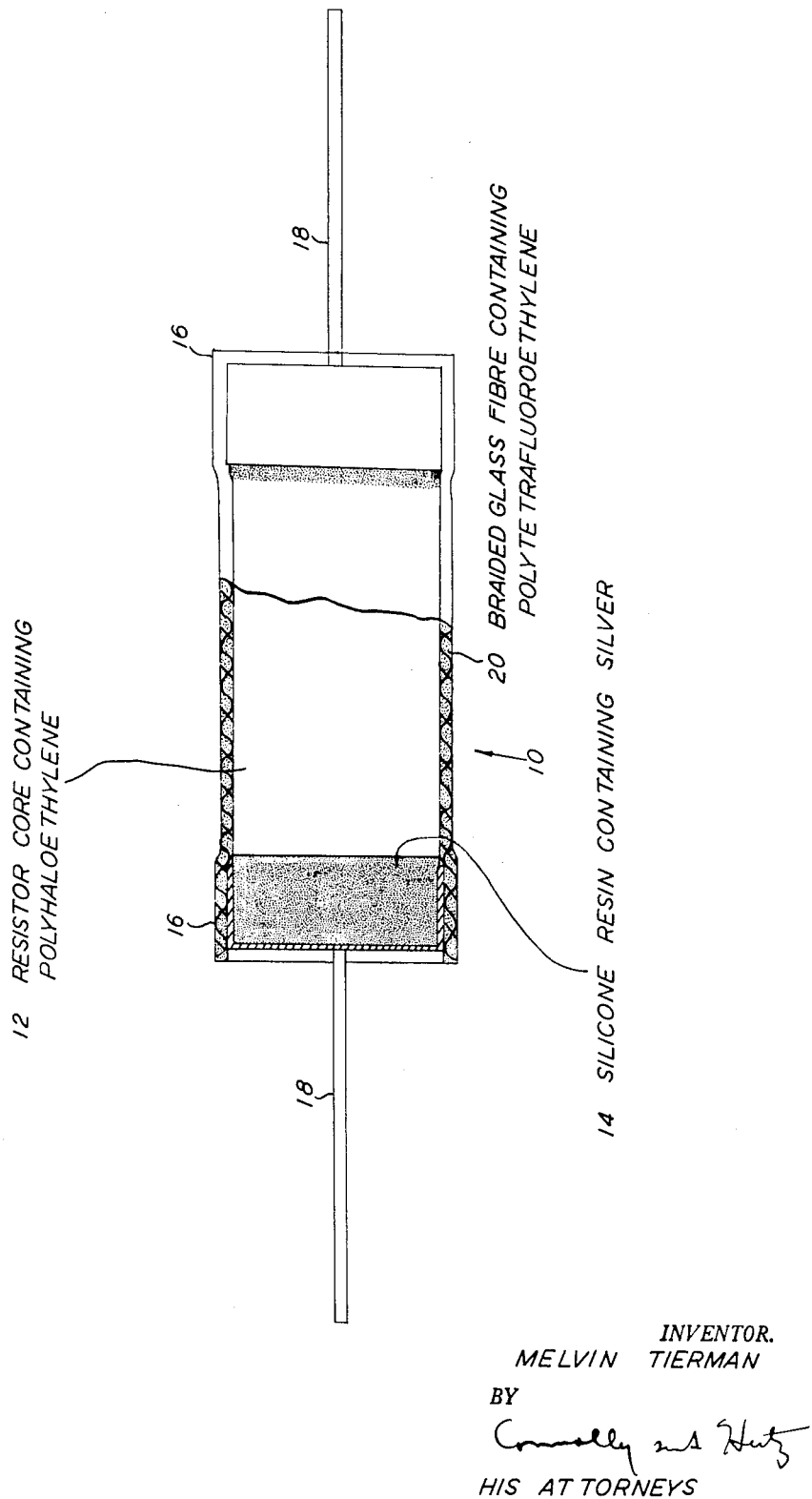

2,744,988

MOLDED RESISTORS

Melvin Tierman, North Adams, Mass., assignor to Sprague Electric Company, North Adams, Mass., a corporation of Massachusetts Application February 7, 1952, Serial No. 270,505

5 Claims. (Cl. 201—64)

The present invention relates to new and improved high temperature resistance elements and to methods of making the same.

Much effort has been expended in the past to produce composition resistors which would be capable of use over a wide temperature range, and which would possess highly desirable temperature coefficients of resistance and resistivity. None of these attempts has been completely successful. This is particularly true in the production of resistance elements which can be used at ambient temperatures of from 200° C. to about 225° C. for extended periods.

It is an object of the present invention to produce resistors which can be used under such elevated temperature conditions. Another object of the invention is to produce molded resistance compositions which can be employed over an extremely wide temperature range, and which possess desirable temperature coefficients of resistance. These and further objects of the invention, as well as the advantages of it, will be apparent from the following detailed description and the appended claims, reference being made to the single figure of the accompanying drawing showing in partial cross-section a resistor exemplifying this invention.

The above aims of the invention are broadly achieved by producing a composition resistor employing a polytetrahaloethylene resin binder with selected filler materials by an improved process. Terminal leads may be applied to the unit produced by these steps by means of a special silver-particle-containing silicone conducting paint, by molding etc. The entire unit is preferably positioned within a polytetrahaloethylene impregnated braided glass fiber sleeve which serves to effectively insulate and protect the unit. Also the resistor may be coated with a layer of resin not containing conducting particles.

The preferred resin used with this invention is a polytetrafluoroethylene compound sold under the trade name "Teflon," although other polytetrahaloethylene resins such as polytrifluorochloroethylene, polydifluoro dichloro ethylene and polytrichlorofluoro ethylene are also satisfactorily employed. Polyvinyl fluoride may also be used, although the maximum operational temperature will be somewhat lower than when a polytetrahaloethylene is employed. Whenever the term "Teflon" is used in this specification it is to be understood that the other polyhaloethylene resins indicated may be used in its place.

In the actual production of the resistance unit a colloidal suspension of all of the filler, and conducting ingredients may be prepared with the aid of a small proportion of a dispersing agent. This suspension may then be added and mixed with a Teflon suspension of a similar variety. The colloidal mixture may then be coagulated by the use of heat or an organic solvent which will break an emulsion, or both, in order to produce a pasty mass from which is filtered the excess liquid. This mass is then pre-shaped in an extrusion press, dried at a relatively low temperature to vaporize the readily volatile constituents present, and then dried at an elevated temperature below the sintering point of the resin until the remaining volatile material is driven off, and cooled. The dried resistance material is next placed and confined in a mold and sintered at a temperature above the transition point of the resin, but below the decomposition point of the resin.

After the unit produced in the above manner is sintered, a silicone paint may be applied to its ends, dried, and appropriate leads are attached, as by soldering or capping. It is also possible to use the modified types of conventional terminal connections with this variety of resistance element, as for example, silver end caps may be applied or silver plated copper wire may be molded into the body of the resistor before sintering. A unit with leads applied may be used in any type of retaining protective casing, or in certain applications it may be employed without any such casing. However, it is preferable to slip it into a fiber glass sheath which has been impregnated with a resin, such as a polytetrahaloethylene resin, in order to protect it during handling and use. Also a coating of Teflon without conductive filler may be applied.

I have discovered that the temperature coefficient of resistance of resistors employing Teflon binders may be made very low by a specific combination of the Teflon binder and the conducting particles with an inert filler. According to my discovery, I have found that optimum results are obtained when the ratio of the total amount of conducting particle plus inert filler to the resin binder is from at least 1:3 to about 2:1. (With higher ratios the physical stability and electrical characteristics are inferior.) When larger relative amounts of resin are employed the temperature coefficient becomes very high and non-linear irrespective of the nature of the conducting material. Since in most instances the actual content of conducting material such as graphite or carbon lies in the range of perhaps 4% to about 25% it is necessary according to my invention that an inert filler be added in order to present the composition within the ratio limits given above. Suitable inert fillers are mica, talc, china clay, ground glass, titanium dioxide, whiting and aluminum oxide. All the ratios cited herein are determined on a weight basis.

As indicated above the conducting particles are ordinarily present in amounts from about 4% to a maximum of about 25% although higher values may be used on occasion for exceptionally low resistance values or other special characteristics. For the lower resistance values graphite, powdered metals such as silver, aluminum, lead, and the like are preferred. For the higher resistance ranges carbon black produced by any one of the numerous processes is particularly suitable due to its availability in fine particle size and its low cost. However, many other conducting and even semi-conducting fillers may be employed such as N and P type ceramic, alloy, and elemental semi-conductors and the like. In all cases, for maximum stability and optimum temperature coefficient characteristics, the linear coefficient of expansion of the gross non-resinous portion of the composition should be from about $3 \times 10^{-6}$ to about $20 \times 10^{-6}$. Values appreciably higher than this will result in larger temperature coefficients of resistance even when the composition falls within the ratio limits noted above.

The colloidal suspension of Teflon, or other resin, used in this invention may be produced in a similar manner to the method used in producing the first suspension. It is preferred to use within from about 30 to 50 grams of solid with about 80 mls. of water. Frequently it is desirable to purchase such a colloidal suspension from one of the commercial producers of the product. In general, these resin suspensions contain from about 40 to about 80% solids with about from 0.05% to about 1% of a detergent dispersing agent. The solids used are preferably smaller than 325 mesh.

The two colloidal suspensions when produced are added to one another in the proper proportions so as to obtain a resistance unit of the desired composition. Preferably the two suspensions are added while being subjected to agitation by a common beater or propeller type stirring device. The combined suspensions once produced may be coagulated in any of the standard methods known to the art to produce a wet pasty sludge. One method which can be used involves merely heating the mixture until sufficient water is vaporized to break the suspension. A second method is to add acetone, ethyl alcohol, or another similar organic solvent which will break the suspension. It is preferred, however, to combine both of these means together and to heat the mixture at from 40° C. to 90° C. while adding from 5% to 25% acetone or ethyl alcohol.

The sludge resulting from this treatment filtered or otherwise separated from the bulk of the liquid according to conventional practice. The pasty mass resulting is then pre-shaped by conventional extrusion equipment into the final shape desired for the resistance element. It is preferred to use a common plunger type device similar to a well-known lard type press in order to accomplish this. Pressures of from 5 to 100 lbs. per square inch may be used, although it is preferred to employ between 10 and 50 lbs. per square inch pressure, depending upon the degree of dryness of the resistance composition.

The wet masses which have been pre-shaped are dried at from about room temperature to about 105° C. for from 4 to 8 hours after they have been pre-shaped in order to remove the last vestige of water present. Temperatures of from about 90° C. to about 125° C. are suitable for this first drying stage. Then the elements are heated to temperatures in excess of 200° C. but below the curing point of the resin (320° C. for Teflon) for periods of from 15 minutes to 3 hours in order to drive off any and all volatilizible material present. The units are dried by this stage procedure so that they will not become friable. If care in handling is exercised they may be dried directly at an elevated temperature.

After they have been cooled the formed pellets are placed in molds and are subjected to pressures of from 5,000 to 50,000 lbs. per square inch for periods of 3 to 5 minutes at normal working temperatures of from 20° C. to about 30° C. This step serves to compact the individual particles within the unit in such a manner that curing the subsequent resin during step a strong conductive unit is produced. While lower pressures than are indicated above are possible, with such lower pressures it is not possible to conveniently develop the high strength of the final unit during the curing step. This curing step is carried out by heating the resistors above the curing temperature of the resin and below the decomposition point of the resin for periods of from one-half hour to 1 hour, depending upon the size of the actual unit. With Teflon, temperatures of from 327° C. to 390° C. are used. After the heating the units are brought back to room temperature.

Then the ends of the elements to which terminal connections are to be made are preferably treated with a special silicone-silver paint. This paint is formed by mixing from 40% to 85% 300 mesh, or smaller, silver flakes with from 3% to 25% of a liquid silicone capable of being polymerized at elevated temperatures, and with an organic solvent, such as xylene, benzene, hexane, toluene, or the like, forming the balance of the composition. A minimum of 10% solvent should be used in the paint with most silicones. Among the silicones which can be used are the aryl-silicones, the alkyl silicones suitable for the formation of heating-setting resins. Included among the same are ethyl, methyl, propyl, butyl, amyl, phenyl, xylyl, naphthyl silicones, alone or co-condensed with one another. Halogen substituted silicones may also be used. Further details on suitable silicone resins may be found in "An Introduction to the Chemistry of Silicones" by Rochow, second edition 1951, published by John Wiley & Sons, New York, New York. These silicones may be defined as organo substituted polysiloxanes in which the organo groups are linked by carbon to silicon bonds.

The silicone paint may be applied to the ends of the unit either by dipping, spraying, or brushing, and is cured by heating at temperatures of from 250° C. to 325° C. for periods of from 5 minutes to 2 hours. Ordinary silver paint such as has been used in the prior art is not suitable for use with the resistors of this invention, because it peels off these resistors at about 200° C. or lower.

When the terminal paint has been cured various end leads may be attached. The preferred method is to pressure force an octagonal cap, which has a terminal lead extending from it, on to each terminal painted end of the resistor. High temperature solders such as copper-zinc or copper-zinc-silver may be adapted to attach suitable end leads.

The finished unit is then preferably slipped within a braided glass sleeve which has been dipped within a Teflon resin suspension of the type employed in forming the resistor itself and finally sintered at from about 327° C. to about 390° C. for a period of 15 minutes to 2 hours. Obviously other resins besides Teflon may be employed. Also other protective coverings such as are commonly employed in the art may be utilized.

The following specific example of the process employed in accordance with the invention is given solely for purposes of illustration, and is not to be considered as limiting the inventive concept in any way.

*Example*

35.5 grams of New England whiting (chalk) 325 mesh was mixed with 4.7 grams calcined "Spheron-9" carbon black produced by Godfrey L. Cabot, Inc. The average particle diameter of the carbon black was 29 millimicrons. These two ingredients were mixed in 70 mls. of water containing 0.25 cc. of "Alrosol" sulfonated fatty acid detergent, manufactured by Alrose Chemical Corporation, in an Eppenbach, Inc. laboratory "Homomixer" for 45 minutes. The suspension was then added to 30 mls. of a Teflon suspension (Du Pont 851–202, manufactured by E. I. du Pont de Nemours & Co., Wilmington, Delaware) containing approximately 55% water and a small amount of Du Pont "Duponol" stabilizer. The actual mixing of the two ingredients was done by adding the first suspension to the second in a vessel equipped with propeller stirrer. While stirring was carried on contents were heated at 40° C. for one-half hour, then 60 mls. of acetone was added and the mixture stirred for another 5 minutes. The resultant products were filtered on a common laboratory Buchner funnel using suction produced by an aspirator. The pasty mass obtained by this procedure was extruded through a ¼" diameter orifice under a pressure of approximately 5 p. s. i., was dried for 4 hours at 100° C., and then was further dried for one hour at 275° C. It was cooled, placed in a ¼" diameter hole-piston type press and compressed at 1200 p. s. i. for 5 minutes. The resistor was then cured at 375° C. for 45 minutes and cooled in air.

A silicone silver paint was manufactured by mixing 3.6 grams of Dow 993 phenyl alkyl silicone liquid, manufactured by the Dow-Corning Glass Works, with 25 grams 325 mesh silver flakes and 7.8 grams of xylene. This paint was brushed on the ends of the unit produced above and was cured at 275° C. for one hour. Appropriate leads were applied by the preferred pressure mechanism. The entire assembly was then slipped within a protective casing formed by dipping braided fiber glass cable in a Teflon suspension of the type used in the formation of the resistor, and curing this casing at 375° C. for 45 minutes.

Using the same general procedure indicated in the above example, numerous resistors of varying compositions have been made. For convenience a summary of these units, together with certain of their properties, are given in the appended table.

| Teflon | Weight Percent (dry basis) | | | Weight Ratio Inorg./Org. | Resistivity, ohm-cm. | Room Temp. Resistance, Ohms | Temp. Coeff., Percent per ° C. |
|---|---|---|---|---|---|---|---|
| | Carbon Black | Whiting | Other | | | | |
| 43.4 | 5.8 | ------ | 50.8 Talc | 1.31 | 1,630 | 12,200 | 0.070 |
| 38.6 | 5.9 | ------ | 55.5 Talc | 1.59 | 2,480 | 17,400 | 0.064 |
| 32.8 | 10.0 | ------ | 57.2 Talc | 2.05 | 445 | 3,720 | 0.057 |
| 36.0 | 10.0 | ------ | 54.0 Talc | 1.78 | 102 | 733 | 0.055 |
| 38.6 | 5.9 | 55.5 | -------------- | 1.60 | 845 | 6,309 | 0.040 |
| 36.2 | 11.8 | 52.0 | -------------- | 1.76 | 30.0 | 209 | 0.051 |
| 39.0 | 5.0 | 56.0 | -------------- | 1.56 | 27,000 | 162,000 | 0.060 |
| 39.3 | 4.0 | 56.7 | -------------- | 1.55 | 400,000 | 3,360,000 | 0.070 |
| 36.2 | 10.0 | 53.8 | -------------- | 1.75 | 9.9 | 86.9 | 0.071 |
| 34.4 | 7.0 | 56.6 | -------------- | 1.75 | 112 | 990 | 0.062 |
| 36.4 | 5.0 | 58.6 | -------------- | 1.75 | 1,660 | 15,900 | 0.064 |
| 40.0 | 5.0 | 55.0 | -------------- | 1.50 | 435 | 4,190 | 0.070 |
| 36.2 | ---- | 52.0 | 11.8 graphite | 1.76 | 344 | 3,440 | −0.016 |
| 32.8 | ---- | 47.2 | 20.0 graphite | 2.05 | 168 | 169 | −0.016 |
| 47.0 | ---- | ------ | 53.0 graphite | 1.13 | .25 | 1.79 | −0.055 |
| 64.0 | ---- | ------ | 36.0 graphite | .56 | 1.50 | 15.0 | −0.056 |
| 72.0 | ---- | ------ | 18.0 graphite | .25 | 5,150 | 34,900 | −0.169 |
| 75.0 | ---- | ------ | 25.0 graphite | .33 | 5.4 | 36.7 | −0.047 |
| 72.0 | ---- | ------ | 28.0 graphite | .39 | 4.1 | 35.9 | −0.029 |
| 36.4 | 3.5 | 56.6 | 3.5 aquadag | 1.75 | 8.7 | 83.7 | −0.013 |
| 36.4 | 3.5 | 56.6 | 3.5 aquadag | 1.75 | 10.5 | 92.7 | −0.013 |
| 40.0 | 3.5 | 53.0 | 3.5 aquadag | 1.50 | 3.3 | 31.5 | −0.017 |
| 40.0 | 3.5 | 53.0 | 3.5 aquadag | 1.50 | 3.3 | 32.5 | −0.014 |

In the accompanying drawing the figure shows the above type of resistor 10. Its molded core is indicated at 12 with the terminal paint 14 at each end. The end caps 16 are fitted over these ends and have their terminal leads 18 extending therefrom. Around the core there is positioned the braided glass fiber sheath 20.

As many apparently widely different embodiments of the invention may be made without departing from the spirit and scope hereof, it is to be understood that the invention is not limited to the specific embodiments hereof, except as defined in the appended claims.

I claim:

1. A high temperature resistor consisting essentially of a sintered uniformly dispersed mixture of a polyhaloethylene resin containing at least one fluorine atom per ethylene unit, with electrically conducting particles and electrically insulating particles, the weight ratio of electrically conducting and electrically non-conducting particles to the resin being from about 1:3 to about 2:1, and terminal connections electrically connected to spaced portions of the sintered mixture.

2. A high temperature resistor having a substantially non-porous body consisting essentially of sintered particles of polytetrafluoroethylene resin and uniformly dispersed electrically conducting and electrically non-conducting particles, the weight ratio of the total of said particles to the resin being from about 1:3 to about 2:1, the linear coefficient of expansion of the non-resinous portion of the composition being from about $3 \times 10^{-6}$ to $20 \times 10^{-6}$ per degree centigrade, and connected terminals electrically bonded to spaced portions of said body.

3. A high temperature resistor possessing an extremely low temperature coefficient of resistance consisting essentially of a dense mass of sintered particles of polytetrafluoroethylene resin in which are uniformly dispersed particles of carbon, graphite and an inorganic, electrically insulating filler, the approximate proportions of said materials being 40 parts of resin, 3.5 parts of carbon, 3.5 parts of graphite and 53 parts of inorganic filler, and connection terminals electrically bonded to spaced portions of the mass.

4. The resistor of claim 2 wherein the terminal connections are bonded in place by a surface coating of a cured silicone resin containing silver powder in an amount of at least twice the amount of the silicone by weight.

5. A high temperature resistor comprising a substantially non-porous body consisting essentially of sintered particles of polytetrafluoroethylene resin and electrically conducting and electrically non-conducting particles, the weight ratio of the total of said particles to the resin being from about 1:3 to about 2:1, the linear coefficient of expansion of the non-resinous portion of the composition being from about $3 \times 10^{-6}$ to $20 \times 10^{-6}$ per degree centigrade, and the exposed resistor surface is encapsulated with a sheath consisting of braided glass fiber impregnated with polytetrafluoroethylene resin.

References Cited in the file of this patent

UNITED STATES PATENTS

| | | |
|---|---|---|
| 1,929,396 | Benkelman | Oct. 3, 1933 |
| 2,134,870 | Fruth | Nov. 1, 1938 |
| 2,332,116 | Schmid | Oct. 19, 1943 |
| 2,400,009 | Brubaker et al. | May 14, 1946 |
| 2,419,655 | Reiser | Apr. 29, 1947 |
| 2,472,801 | Barfield et al. | June 14, 1949 |
| 2,512,280 | Lemmers | June 20, 1950 |
| 2,559,077 | Johnson et al. | July 3, 1951 |
| 2,609,470 | Quinn | Sept. 2, 1952 |